June 23, 1959

H. R. MILLER 2,892,072

ARC WELDING

Filed July 8, 1957

Howard R. Miller
inventor

Barnwell R. King
attorney

United States Patent Office 2,892,072
Patented June 23, 1959

2,892,072

ARC WELDING

Howard R. Miller, Clark Township, Union County, N.J., assignor to Union Carbide Corporation, a corporation of New York Application July 8, 1957, Serial No. 670,530

6 Claims. (Cl. 219—131)

This invention relates to gas shielded electric arc welding and more particularly to work-in-circuit refractory or non-consumable electrode alternating current arc welding of metals having refractory oxides, such as aluminum, and magnesium, preferably in a suitable arc shielding gas such as argon alone, or argon mixed with helium and/or small amounts of oxygen.

According to the present invention a direct current pilot arc is drawn between the main electrode and an adjacent auxiliary electrode to start and stabilize an alternating current welding arc between such main electrode and the work to be welded. This avoids the use of undesirable high frequency for A.C. welding.

Figure 1:
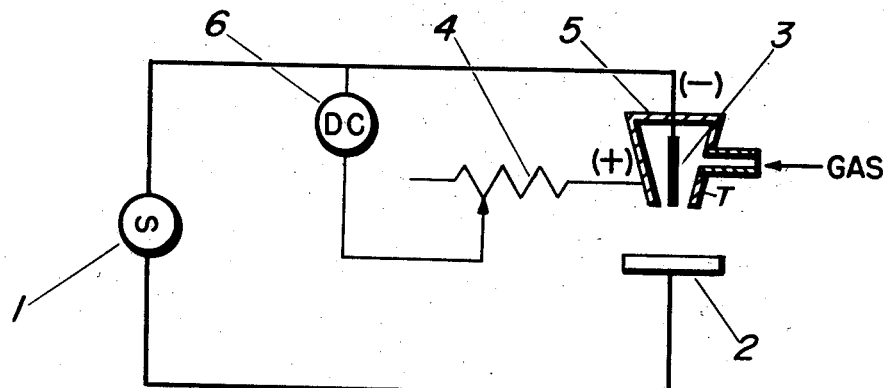
Fig. 1 is a circuit diagram illustrating the invention.

As shown in Fig. 1 a suitable source 1 of alternating current for electric arc welding is connected across a workpiece 2 to be welded and a refractory or non-consumable electrode 3 in torch T. An adjustable resistance 4 is connected to one side to a gas cup or nozzle 5 of electrically conductive material that surrounds the electrode 3, the other side of such a resistor being connected to the positive (+) side of a direct current source 6 of pilot arc current, the negative (−) side of which is connected to the electrode 3. The electrode 3 and cup 5 are electrically insulated from each other, so that the D.C. pilot arc is drawn between the internal annular orifice of such cup and the business end of the electrode 3.

In operation the direct current pilot arc is drawn between the electrode 3 and the cup 5, so that a stream of ionized arc shielding gas such as argon, is discharged from the cup toward the work 2. Thus, when the alternating current source 1 of welding current is connected across the work 2 and electrode 3, an alternating current welding arc is automatically established therebetween, which arc is not only initiated by such D.C. pilot arc but is stabilized thereby. That is to say, objectionable rectification of the A.C. welding arc is overcome.

Figure 2:
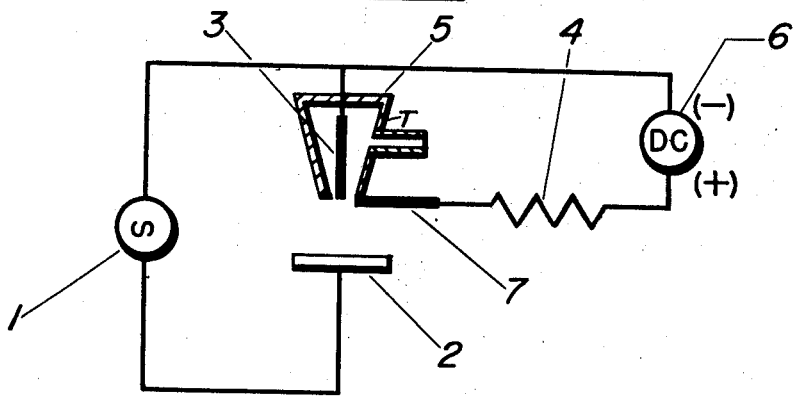
Figs. 2 and 3 are similar views of modifications.

In Fig. 2 the circuit is somewhat similar except that an auxiliary electrode 7 is provided that is attached to the cup 5 as distinguished from being the cup itself as in Fig. 1. Otherwise the circuits are similar. This arrangement makes it possible to use cups of different diameters.

Figure 3:
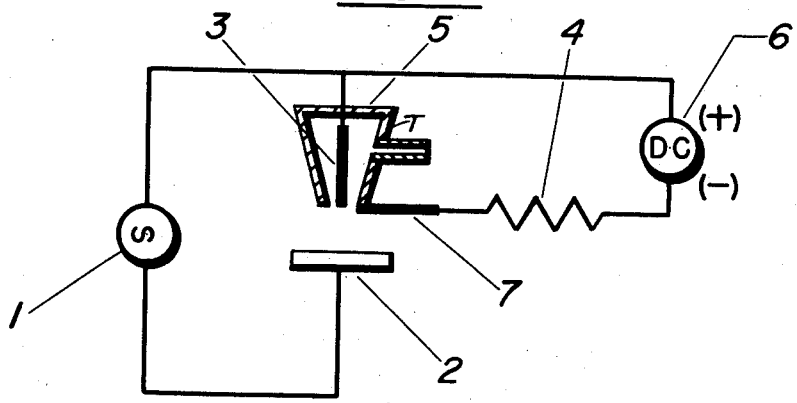

In Fig. 3 reverse polarity D.C. is applied to the main electrode 3 and auxiliary electrode 7, whereas in Figs. 1 and 2 straight polarity D.C. is used. While reverse polarity can be used as shown in Fig. 3, straight polarity for the D.C. pilot arc is preferred. Argon is preferably used as the arc shielding gas, but mixtures of argon and helium can be used, and even helium alone although results with helium alone have not been entirely satisfactory.

Starting an alternating current inert gas tungsten arc, using a pilot-arc according to the invention has proven to be satisfactory under all conditions and circuit connections tested. When comparing pilot-arc starting to high-frequency starting at the same conditions of current, open-circuit voltage and gas flows, it was found that greater arc gaps could be bridged with the D.C. pilot-arc than with high-frequency. Pilot-arc starting with D.C. was found to be completely reliable in addition to possessing the desirable feature of enabling the operator to see the joint to be welded before striking the main A.C. arc.

Stabilizing characteristics were investigated using a number of alternating current power supplies having open-circuit voltages ranging from 58 to 150 volts. In each case, both balanced and unbalanced waves were tested. When using an unbalanced wave, it was found that satisfactory stabilization could be obtained with machines having open-circuit voltages above approximately 80 volts. Stabilization was erratic when machines having lower open-circuit voltages were used. When using a balanced wave, satisfactory results were obtained from all machines at current levels above approximately 100 amperes. When using current levels lower than about 100 amperes some trouble was encountered with the relatively (less than about 80 volts) low open-circuit voltage machines.

This application is a continuation in part of my application, Serial No. 508,728, filed May 16, 1955, now Patent No. 2,798,937, dated July 9, 1957.

What is claimed is:

1. In a gas shielded electric arc welding system, a main electrode disposed to be connected in circuit relation with a single phase alternating current source of welding current and a workpiece for maintaining an alternating current welding arc with the workpiece, and an auxiliary electrode disposed in insulated relation with the main electrode and connected to a direct current source of welding current to maintain an auxiliary direct current pilot arc between the main and auxiliary electrodes to initiate and stabilize such alternating current welding arc between the main electrode and workpiece.

2. The combination with a single phase alternating current source of welding current and a welding torch having a main electrode disposed to be connected in circuit relation with such source and work upon which a welding operation is to be performed, of an auxiliary electrode mounted in arcing relation with such main electrode, and circuit means connected to apply voltage from a direct current source of pilot arc current between the main and auxiliary electrodes, which operates to overcome objectionable rectification of such alternating current.

3. In an arc welding system, a welding torch having a main electrode, an alternating current source disposed to be connected in circuit relation with such main electrode and a workpiece upon which a welding operation is to be performed, a gas nozzle comprising an auxiliary electrode disposed on the torch in arcing relation with the main electrode, and circuit means including a resistor connected to apply a direct current voltage between the main and auxiliary electrodes for starting and stabilizing such alternating current welding arc.

4. The combination with an electric arc welding torch comprising a central electrode and a gas cup of metal having an annular gas outlet orifice that is concentric with one end of said central electrode; of a direct current source connected across said electrode and cup for energizing a direct current pilot arc between such electrode end and the inside of said orifice, a source of arc shielding gas connected to the annular space between said electrode and orifice for discharging a stream of direct current pilot-arc ionized gas from such orifice of said cup, and a circuit for energizing a main alternating current welding arc between such electrode end and an external work electrode when such direct current pilot-arc ionized gas stream is applied to such external work electrode.

5. The combination with a inert gas shielded arc torch comprising a cup from which gas is discharged around a main non-consumable metal electrode, an auxiliary electrode electrically insulated from such main electrode, of a source of direct current connected across said electrodes, which energizes a direct current pilot-arc therebetween which keeps the end of said electrode sufficiently hot to initiate a main alternating current arc between such main electrode and a workpiece when the latter are connected to a suitable source of current, and means for connecting a source of alternating current across said electrode and a workpiece for energizing a main arc therebetween, which is initiated and stabilized by said direct current pilot arc in the arc shielding gas stream that is discharged by such cup.

6. Process of gas-shielded electric arc welding which comprises discharging a stream of gas about the end of a main electrode, drawing a direct current pilot arc between such main electrode and an adjacent auxiliary electrode in such gas stream, and initiating and stabilizing therewith an alternating current welding arc between such main electrode and work to be welded by such welding arc in such gas stream.

References Cited in the file of this patent

UNITED STATES PATENTS

| | | |
|---|---|---|
| 2,277,909 | Holslag | Mar. 31, 1942 |
| 2,516,037 | Williams | July 18, 1950 |
| 2,574,514 | Volff et al. | Nov. 13, 1951 |
| 2,583,507 | Carpenter et al. | Jan. 22, 1952 |